(12) United States Patent
Song et al.

(10) Patent No.: US 7,712,969 B2
(45) Date of Patent: May 11, 2010

(54) BAIL TYPE UNLOCKING AND RESETTING DEVICE FOR HOT PLUGGABLE OPTO-ELECTRONIC MODULE

(75) Inventors: Beili Song, Hubei (CN); Benqing Quan, Hubei (CN); Jianfeng Luo, Hubei (CN); Mingsuo Gao, Hubei (CN)

(73) Assignee: Wuhan Telecommunication Devices Co., Ltd., Hongshan District, Wuhan, Hubei (CN)

( * ) Notice: Subject to any disclaimer, the term of this patent is extended or adjusted under 35 U.S.C. 154(b) by 0 days.

(21) Appl. No.: 12/438,258

(22) PCT Filed: Nov. 3, 2006

(86) PCT No.: PCT/CN2006/002958

§ 371 (c)(1),
(2), (4) Date: Feb. 20, 2009

(87) PCT Pub. No.: WO2008/028346

PCT Pub. Date: Mar. 13, 2008

(65) Prior Publication Data

US 2009/0321301 A1    Dec. 31, 2009

(30) Foreign Application Priority Data

Aug. 30, 2006    (CN) .................... 2006 2 0098737 U

(51) Int. Cl.
G02B 6/36    (2006.01)
(52) U.S. Cl. .......................................... 385/53; 385/92

(58) Field of Classification Search .................... 385/53, 385/92, 55
See application file for complete search history.

(56) References Cited

U.S. PATENT DOCUMENTS

| 6,746,158 | B2 * | 6/2004 | Merrick ....................... 385/53 |
| 6,929,403 | B1 * | 8/2005 | Arciniegas et al. ............ 385/55 |
| 7,351,090 | B1 * | 4/2008 | Moore ........................ 439/372 |
| 2004/0033027 | A1 * | 2/2004 | Pang et al. .................... 385/53 |
| 2004/0066567 | A1 | 4/2004 | Blackwell |
| 2007/0041687 | A1 * | 2/2007 | Mizue et al. .................. 385/92 |

FOREIGN PATENT DOCUMENTS

| CN | 1335692 A | 2/2002 |
| CN | 268795 Y | 3/2005 |
| WO | WO03/014790 | 2/2003 |

* cited by examiner

*Primary Examiner*—Sung H Pak
*Assistant Examiner*—Eric Wong
(74) *Attorney, Agent, or Firm*—Cohen Pontani Lieberman & Pavane LLP

(57) ABSTRACT

An unlocking and resetting device for an opto-electronic module comprises a casing having a blind hole and a horizontal slide slot, and first and second mounting parts; an elastic piece; a shell; first springs; an insert block adapted to be inserted into the blind hole; a brake member adapted to be inserted and disposed in the horizontal slide slot; second springs; first and second pressing blocks adapted to be mounted onto first and second mounting parts; and a bail having a cam portion. The single-arm bail of the unlocking and resetting device can return the start position automatically without manual repositions.

8 Claims, 5 Drawing Sheets

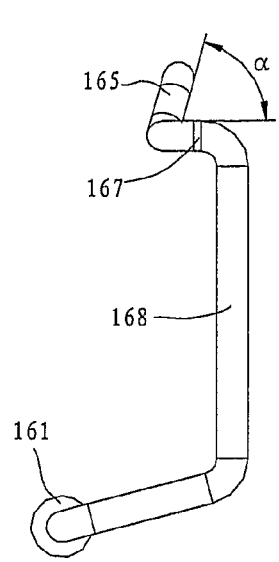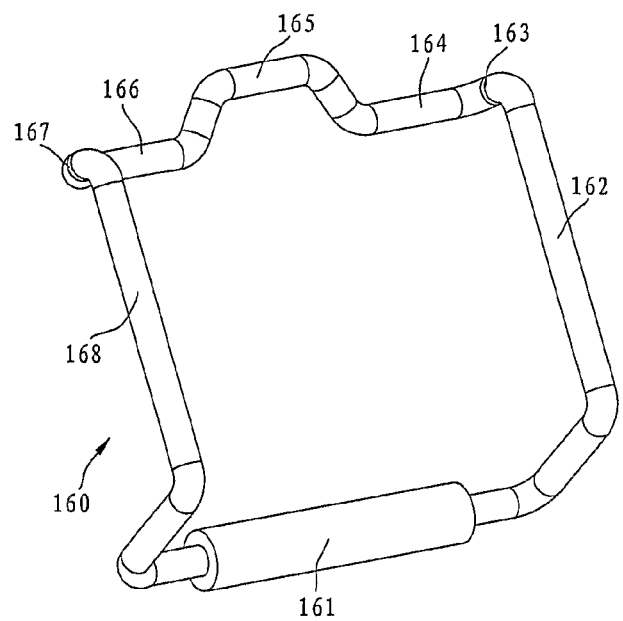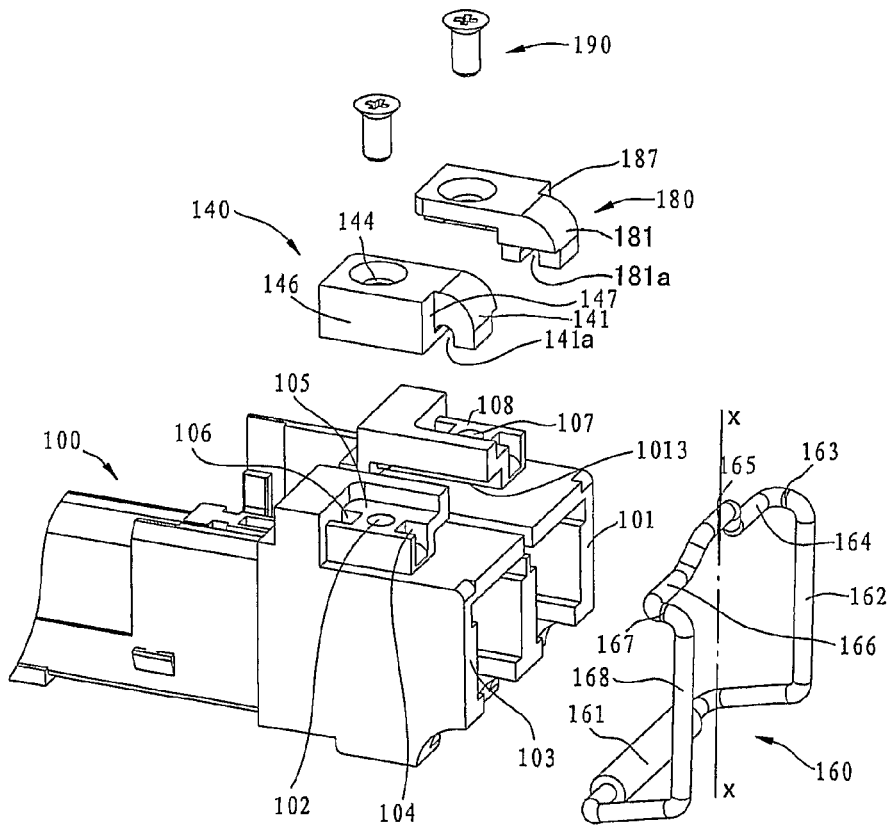

US 7,712,969 B2

BAIL TYPE UNLOCKING AND RESETTING DEVICE FOR HOT PLUGGABLE OPTO-ELECTRONIC MODULE

PRIORITY CLAIM

This is a U.S. national stage of application No. PCT/CN2006/002958, filed on Nov. 3, 2006. Priority is claimed on the following application(s): Country: China, Application No.: 200620098737.2, Filed: Aug. 30, 2006, the content of which is incorporated here by reference.

BACKGROUND OF THE INVENTION

1. Technical Field of the Invention

The present invention generally relates to an unlocking and resetting device for opto-electronic module used in optical communication field, and particularly, to an unlocking and resetting device for hot pluggable opto-electronic module such as an optical transceiver, which is provided with a bail.

2. Description of the Related Art

Conventionally, there are mainly two types of unlocking manner in which a hot pluggable opto-electronic module can be unlocked: the first unlocking manner in which the hot pluggable opto-electronic module is unlocked by pushing the locking elastic piece of the shielding cage up, and the second unlocking manner in which the hot pluggable opto-electronic module is unlocked by lowering a projecting block on the housing of the opto-electronic module having locking functions below the top surface of the housing.

Chinese Utility Model Application CN2687957Y has disclosed an unlocking device in which the second unlocking manner is employed, and the unlocking device comprises a casing, a shell, an insert block, a brake member, a bail, a pin, and springs.

The insert block is inserted into a vertical groove of the casing, and the shell is fitted over the casing from above so as to limit the insert block. The brake member is inserted into a horizontal slot and the bail is mounted to the casing by means of the pin so as to rotate about the pin. The horizontal beam of the bail pushes against the rear end surface of the brake member so as to push the brake member toward the cage. The second bevel at the front end surface of the brake member abuts against the first bevel of the insert block, so that the insert block is pressed down so as to achieve the unlocking.

The springs are disposed between the insert block and the casing and between the brake member and the casing and used to restore the insert block and the brake member. The second unlocking manner is applicable to a compact cage.

SUMMARY OF THE INVENTION

The present invention is directed to improvements on the conventional unlocking device, so that the unlocking and resetting device of the present invention is easy to be mounted, can be restored excellently, has good griping feeling, and is suitable for a more compact cage apparatus.

Accordingly, embodiments of the present invention is to provide an unlocking and resetting device adapted for various hot pluggable opto-electronic modules and satisfying the requirements of the developments of communication equipment.

According to an aspect of the present invention, there is provided with an unlocking and resetting device for an opto-electronic module, comprising: a casing having a substantially rectangular parallelepiped shape and formed with a blind hole and a horizontal slide slot, in which the blind hole is formed vertically in the casing adjacent to the first end of the casing and the horizontal slide slot is formed at a top surface of the casing and closer to the first end than the blind hole, and first and second mounting parts are formed in the top surface of the casing at both sides of the horizontal slide slot and symmetrical with each other about a longitudinal axis of the casing; an elastic piece adapted to be mounted onto the casing from a bottom of the casing; a shell adapted to be fitted over the casing from a top of the casing; first springs adapted to be disposed in the blind hole; an insert block adapted to be inserted into the blind hole, in which a slide groove is formed vertically at a top end of the insert block and a bottom end of the insert block is to be supported by the first springs; a brake member adapted to be inserted and disposed in the horizontal slide slot; second springs to be disposed between the horizontal slide slot and the brake member along the longitudinal direction of the casing; first and second pressing blocks adapted to be mounted onto first and second mounting parts and formed with first and second extensions respectively, in which first and second U-shape grooves are formed in bottom surfaces of the first and second extensions respectively; and a bail disposed at the first end of the casing and including a handle, a second side arm, a second connection arm, a second rotation shaft, a cam portion, a first rotation shaft, a first connection arm, and a first side arm which are connected orderly, in which the cam portion is adapted to abut a front end of the brake member and the first and second rotations are adapted to be received in the first U-shape groove of the first pressing block and the second U-shape groove of the second pressing block, respectively.

Further, a boss is formed on a bottom surface of the blind hole, first and second conical protrusions are formed on first and second end surface portions of the horizontal slide slot respectively for engaging the second springs; and first and second projecting bars are extended from the first and second end surface portions along and on the bottom surface of the horizontal slide slot for positioning the second springs.

Preferably, a first bevel is formed in the slide groove of the insert block, and an extension projection is formed on the bottom end of the insert block.

Moreover, the first pressing block are formed with front and rear bosses on a bottom surface thereof, a first through hole is formed between the first boss and the second boss, and a first side wall is extended from the bottom surface of the first pressing block at a side of the front and rear bosses and at the first end of the first pressing block adjacent to the front boss, and the second pressing block are formed with front and rear bosses on a bottom surface thereof, a second through hole is formed between the first boss and the second bosses, and a second side wall is extended from the bottom surface of the second pressing block at a side of the front and rear bosses and at the first end of the second pressing block adjacent to the front boss.

Preferably, an angle α formed between a plane where the cam portion is located and the first connection arm as well as the second connection arm is in a range of 72 to 78 degree.

Further, the handle is made of a plastic material having good griping feeling.

In addition, the brake member has a front end surface, a rear end surface opposite to the front end surface, first and second stop lugs extended from two side surface of the brake member adjacent to the front end surface and the bottom surface of the brake member respectively, and a slide rod extended from the rear end surface of the brake member, and a second bevel is formed at a distal end of the slide rod and adapted to abut against the first bevel.

Further, an angle β between the second bevel and the horizontal plane is in a range of 27 to 33 degree.

With the present invention, the following advantages can be achieved.

1. The operations of mounting and unlocking the opto-electronic module conform to the user's habits, so that it is not necessary for the user to remember the operations painstakingly and to have great skills.

2. The assembling and disassembling can be performed by using the brake device of the opto-electronic module without depending on the metal shielding cage and device panel, and the unlocking and resetting device is suitable for the cage which has stricter requirements.

3. The bail can be assembled easily and simply and has a high reliability.

4. The bail of the unlocking and resetting device can return (restore) to the start position automatically without manual resetting operations.

BRIEF DESCRIPTION OF THE DRAWINGS

FIG. 4 is a schematic view showing the bail of the unlocking and resetting device in FIG. 1;

FIG. 5 is a schematic perspective view showing the bail of the unlocking and resetting device in FIG. 1;

FIG. 6 is a schematic view showing the mounting of bail of the unlocking and resetting device in FIG. 1;

REFERENCE NUMERALS IN THE DRAWINGS

Figure 1:
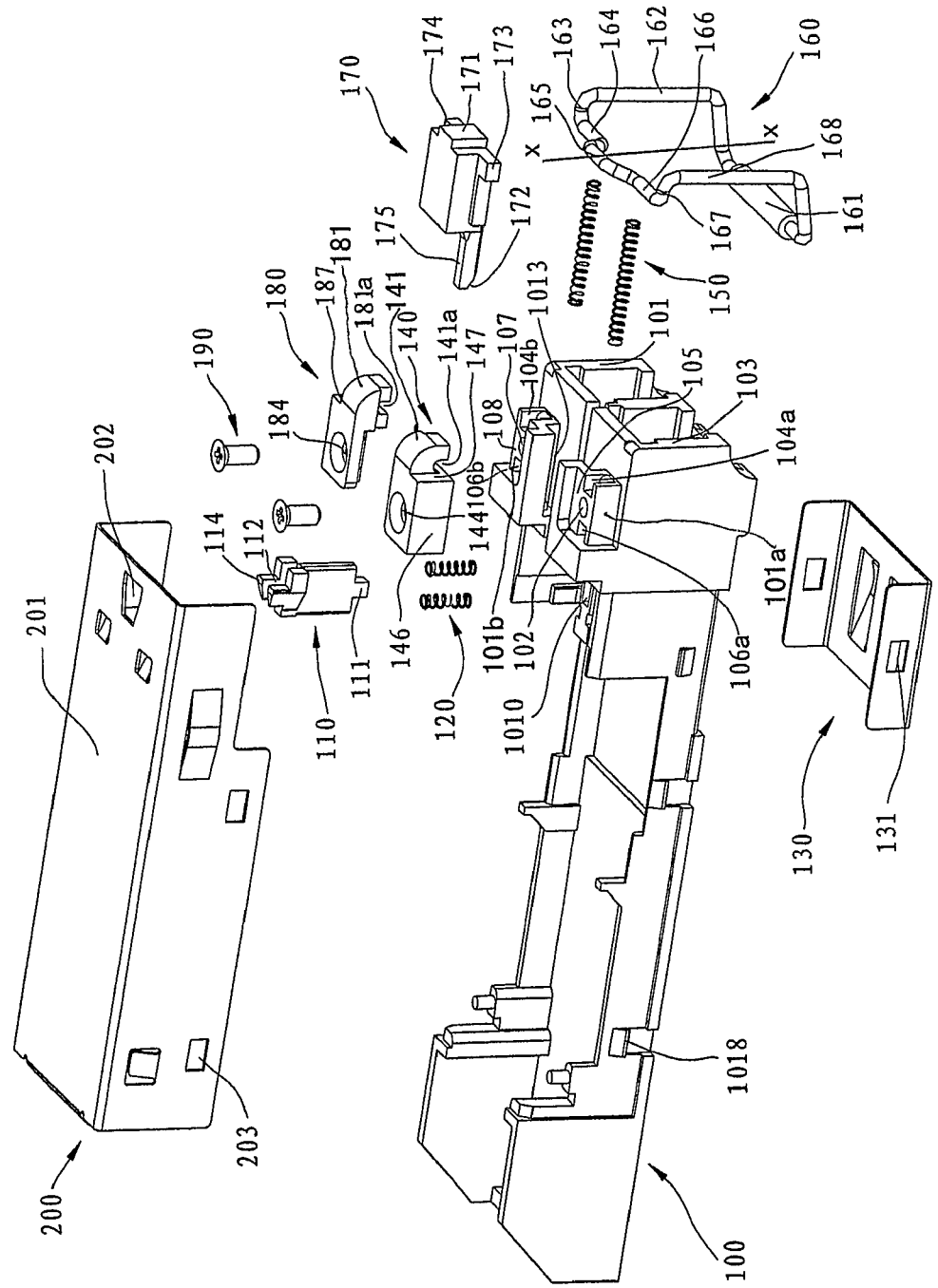
FIG. 1 is an exploded schematic view showing structure of the unlocking and resetting device according to an embodiment of the present invention.

100—casing; 101—second end surface portion; 102—first threaded hole;
101a—first mounting part; 101b—second mounting part;
103—first end surface portion;. 104a, 104b—front notch;
105—first top surface; 106a, 106b—rear notch; 107—second threaded hole;
108—second top surface; 109—boss; 1010—blind hole;
1011—first projecting bar; 1012—first conical protrusion;
1013—horizontal slide slot; 1014—second projecting bar;
1015—second conical protrusion; 1016—first end surface portion;
1017—second end surface portion; 1018—catching hook;
110—insert block; 111—extension projection; 112—slide groove;
113—fist bevel; 114—projecting surface; 120—first spring;
130—elastic piece; 131—catching groove; 140—first pressing block;
141—first extension; 142—front boss; 141a—first U-shape groove;
143—bottom surface; 144—first through hole; 145—rear boss;
146—first side wall; 147—stop surface; 150—second spring; 160—bail;
161—handle; 162—second side arm; 163—second connection arm;
164—second rotation shaft; 165—cam portion; 166—first rotation shaft;
167—first connection arm; 168—first side arm; 170—brake member;
171—front end surface; 172—second bevel; 173—first stop lug; 174—second stop lug;
175—slide rod; 180—second pressing block; 181—second extension;
181a—U-shape groove;
182—front projection; 183—bottom surface; 184—second through hole;
185—rear projection; 186—second side wall; 187—stop surface; 190—screw;
200—shell; 201—top surface; 202—through opening; 203—catching groove

DETAILED DESCRIPTION OF THE PREFERRED EMBODIMENTS OF THE INVENTION

Embodiments of the present invention will be described in detail with reference to drawings, the embodiments described herein are explanatory and illustrative and shall not be construed to limit the present invention. The same elements are denoted by like reference numerals throughout the descriptions.

As shown in FIG. 1, an unlocking and resetting device for opto-electronic module such as an optical transceiver according to an embodiment of the present invention comprises two first springs 120, an elastic piece 130 having a substantial U-shape cross-section, two second springs 150, screws 190, a shell 200, a casing 100, an insert block 110, a first pressing block 140, a second pressing block 180, a bail 160, and a brake member 170.

The components of the unlocking and resetting device for opto-electronic module according to an embodiment of the present invention are described below respectively.

1. Casing 100

Figure 7:
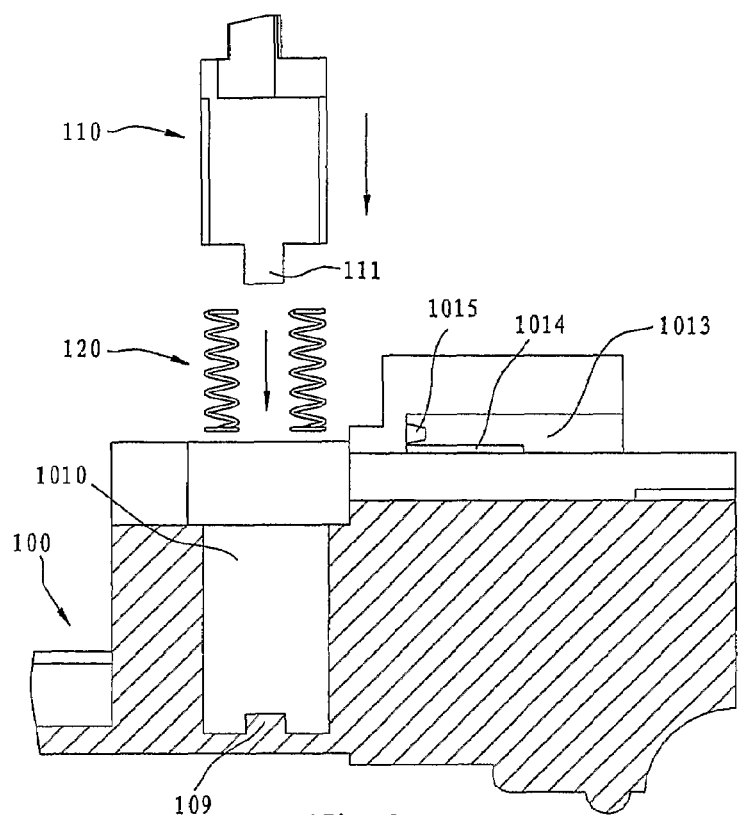
FIG. 7 is a schematic view showing the mounting of insert block of the unlocking and resetting device in FIG. 1.
Figure 8:
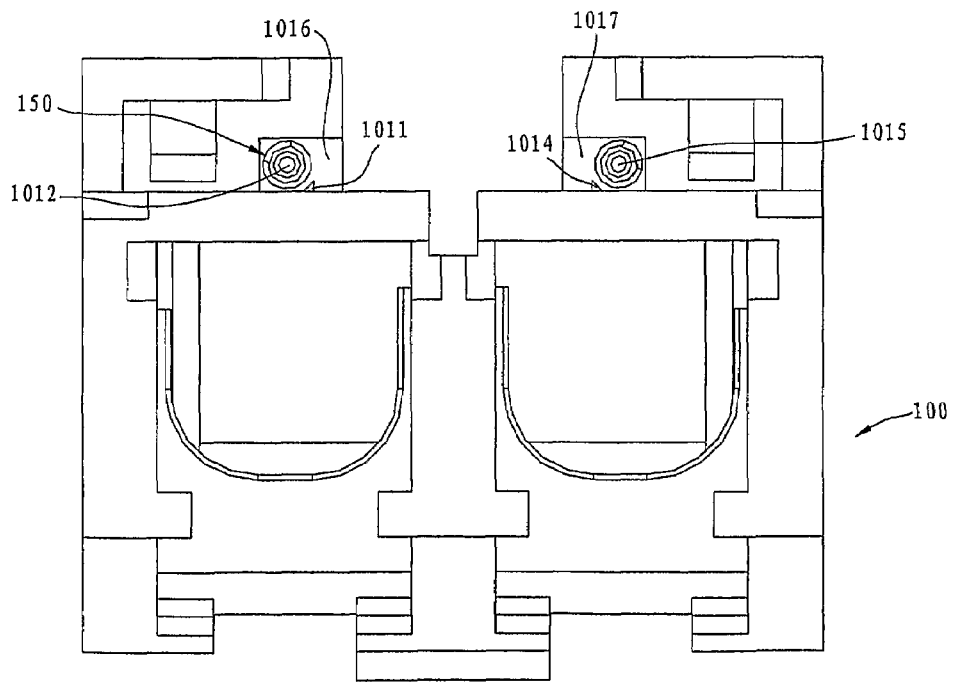
FIG. 8 is a schematic view showing the mounting of second springs of the unlocking and resetting device in FIG. 1.

As shown in FIGS. 1 and 7-8, the casing 100 has a substantially rectangular parallelepiped shape. More particularly, a blind hole 1010 is formed vertically in the casing 100 adjacent to the first end (right end in FIG. 1) of the casing 100, the blind hole 1010 preferably has a square cross-section. A boss 109 is formed on the bottom surface of the blind hole 1010 and projects upwards from the bottom surface of the blind hole 1010, as shown in FIG. 7.

Near the first end of the casing 100, a first mounting part 101a and a second mounting part 101b are formed on the top surface of the casing 100 and are symmetrical about a longitudinal axis of the casing 100. The first and second mounting parts 101a, 101b are formed with a first threaded hole 102 and a second threaded hole 107, respectively. The first and second pressing blocks 104, 108 will be received by and mounted on the first and second mounting parts 101a, 101b, respectively.

At the top surface of the casing 100, a horizontal slide slot 1013 is formed between the first threaded hole 102 and the second threaded hole 107, and a first conical protrusion 1012 is formed on a substantial center of a first end surface portion 1016 (left end surface in FIG. 1) and a second conical protrusion 1015 is formed on a substantial center of a second end surface portion 1017 (left end surface in FIG. 1). First and second projecting bars 1011, 1014 are formed in the horizontal slide slot 1013. The first projecting bars 1011 has a substantially triangular cross-section and is extended from the first end surface portion 1016 along and on the bottom surface of the horizontal slide slot 1013, and the second projecting bars 1014 has a substantially triangular cross-section and is extended from the second end surface portion 1017 along and on the bottom surface of the horizontal slide slot 1013.

The insert block 110 is to be inserted and fitted into the blind hole 1010, the boss 109 is used to position the two first springs 1012. The first and second mounting parts 101*a*, 101*b* of the casing 100 are used to receive and fit with the first and second pressing blocks 104, 108. Screws 190 pass through first and second through holes 144, 184 of the first and second pressing blocks 104, 108 and then screw into the first and second threaded holes 102, 107, respectively. The brake member 170 is to be fitted into and received in the horizontal slide slot 1013. The first conical protrusion 1012 positions one end of one of the second springs 150, and the second conical protrusion 1015 positions one end of the other of the second springs 150. The first and second projecting bars 1011, 1014 are used to limit and hold the two second springs 150, respectively.

2. Insert Block 110

Figure 10:
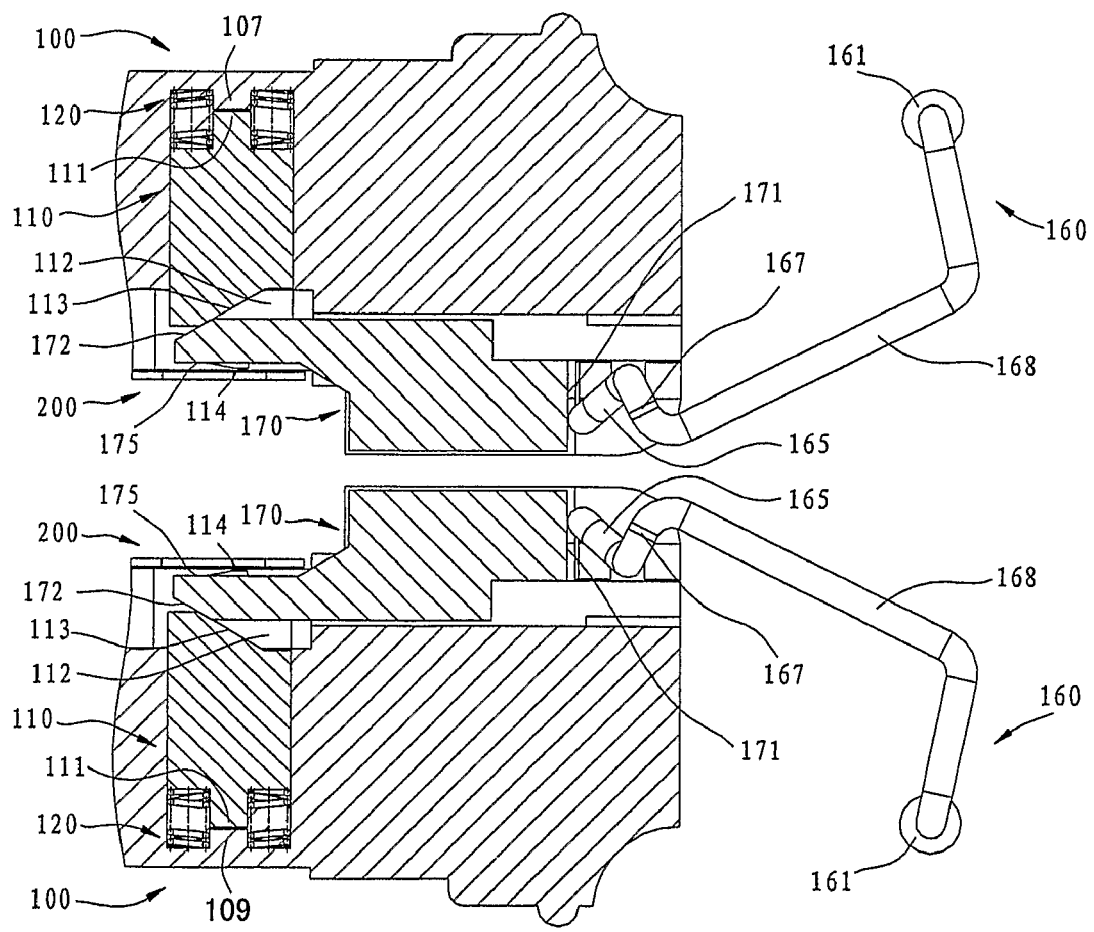
FIG. 10 is a schematic view showing the relative position of the unlocking and resetting device in the cage, in which two opto-electronic modules are shown.

As shown in FIGS. 1, 7, and 10, the insert block 110 has a structure in the form of a long block. More particularly, a slide groove 112 is formed at a center portion at the top end of the insert block 110 and extended towards the bottom end of the insert block 110 by a predetermined depth. A first bevel 113 is formed in the slide groove 112, as shown in FIG. 10. In FIGS. 1 and 10, the first bevel 113 is upgrade leftward. An extension projection 111 is formed at the bottom end of the insert block 110 and extended downward.

A lower part of the insert block 110 is inserted and fitted into the blind hole 1010 of the casing 100, and an upper part of the insert block 110 passes through the through opening 202 formed through the top surface of the shell 200 so as to be engaged with the locking elastic piece of the shielding cage (not shown). A slide rod 175 of the brake member 170 is slidably fitted in the slide groove 112 such that the first bevel 113 in the slide groove 112 will match and fit with a second bevel 172 formed at the tip end of the slide rod 175. Preferably, the first bevel 113 and the second bevel 172 have the same slope, as shown in FIG. 10. The extension projection 111 cooperates with the boss 109 at the bottom surface of the blind hole 1010 so as to position the first springs 120, as shown in FIG. 10.

During mounting, the two first springs 120 are first inserted into the blind hole 1010 along both sides of the blind hole 1010. Next, the insert block 110 is inserted into the blind hole 1010 from above and then presses the two first springs 120. Finally, the shell 200 is fitted over the casing 100 from above and mounted thereto. The direction of inserting the insert block 110 is perpendicular to that of inserting the opto-electronic module into the shielding cage.

3. First Springs 120

As shown in FIGS. 7 and 10, the first springs 120 are vertically inserted into and disposed in the blind hole 1010 of the casing 100 so as to bias the insert block 110 upward, so that the insert block 110 can return (restore) to its initial position.

4. Elastic Piece 130

As shown in FIG. 1, the elastic piece 130 has a substantial U-shape with catching grooves 131 being provided at both side walls of the elastic piece 130. Engagement between the elastic piece 130 and the casing 100 is similar to that between the shell 200 and the casing 100, that is, the catching grooves 131 are engaged with catching hooks (not shown) so as to mount the elastic piece 130 to the casing 100.

5. First Pressing Block 140

Figures 2, 3:
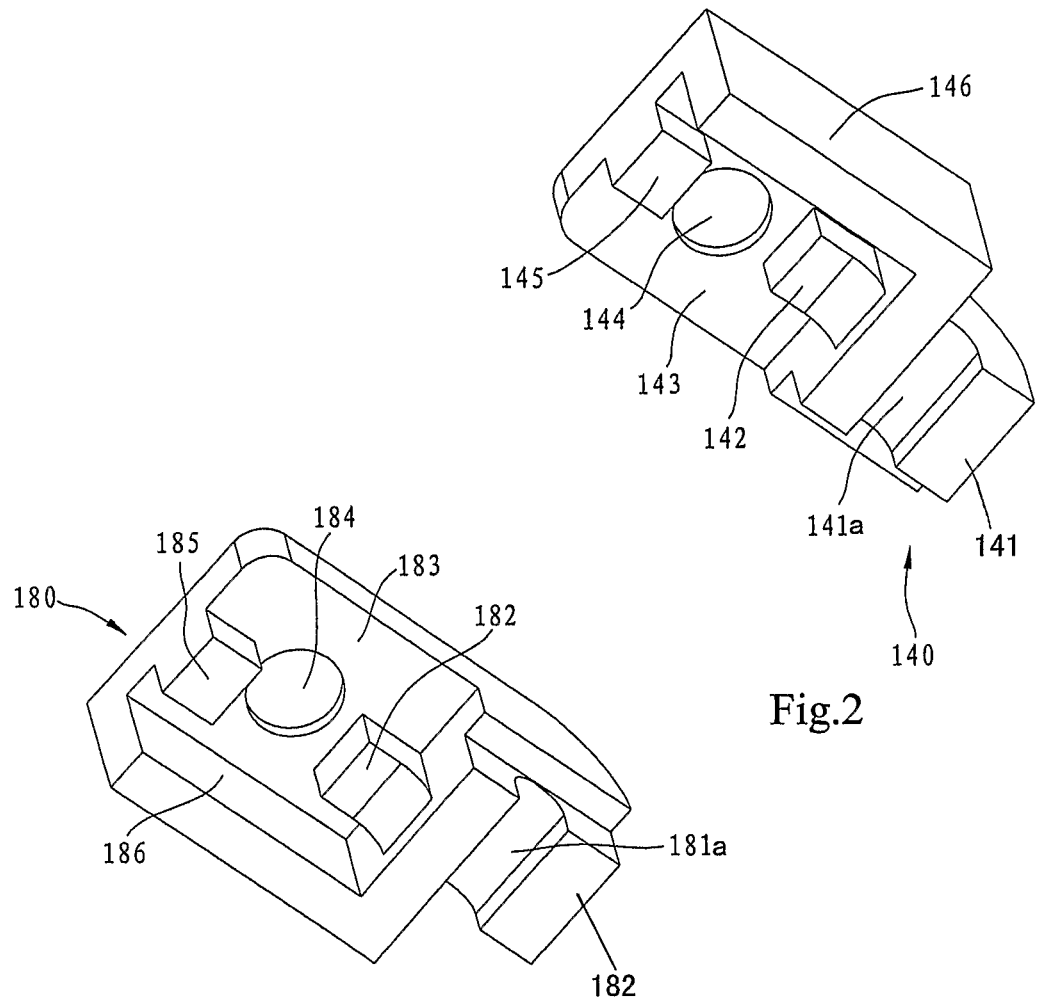
FIG. 2 is a schematic view showing the first pressing block of the unlocking and resetting device in FIG. 1.
FIG. 3 is a schematic view showing the second pressing block of the unlocking and resetting device in FIG. 1.

As shown in FIGS. 1-2 and 6, the first pressing block 140 is a block formed with a through hole and U-shape groove. Particularly, a rear boss (left boss in FIGS. 1-2 and 6) 145 and a front boss (right boss in FIGS. 1-2 and 6) 142 are formed on the bottom surface of the first pressing block 140. A first through hole 144 is formed through the first pressing block 140 between the front and rear bosses 142, 145. A first side wall 146 is extended from the bottom surface of the first pressing block 140 at a side of the front and rear bosses 142, 145 and at a first end (right end in FIGS. 1 and 6) of the first pressing block 140 adjacent to the front boss 142. A first extension 141*a* is extended from the first end surface of the first pressing block 140, and a first U-shape groove 141 is formed in the bottom surface of the first extension 141*a*.

The front and rear bosses 142, 145 of the first pressing block 140 are to be fitted in front and rear notches 104*a*, 106*a* respectively so as to accurately position the first pressing block 140 on the casing 100, in which the front and rear notches 104*a*, 106*a* are formed at front and rear sides of the first threaded hole 102 of the first mounting part 101*a* along the longitudinal direction of the casing 100 (right and left direction in FIGS. 1 and 6).

In the assembled state of the opto-electronic module, when a handle 161 of the bail 160 is rotated upward, a first rotation shaft 166 of the bail 160 applies an acclivitous force to the first pressing block 140 by pressing against the first U-shape groove 141 of the first extension 141*a*. The first side wall 146 of the first pressing block 140 serves the function of reinforcing.

One screw 190 passes through the first through hole 144 and then is screwed into the first threaded hole 102, so that the bottom surface 143 of the first pressing block 140 abuts on the first top surface 105 of the first mounting part 101*a* of the casing 100.

6. Second Pressing Block 180

As shown in FIGS. 1, 3 and 6, the structure of the second pressing block 180 is symmetrical with that of the first pressing block 180 about the longitudinal axis of the casing 100.

Particularly, a rear boss (left boss in FIGS. 1-2 and 6) 185 and a front boss (right boss in FIGS. 1-2 and 6) 182 are formed on the bottom surface of the second pressing block 180. A second through hole 184 is formed through the second pressing block 180 between the front and rear bosses 182, 185. A second side wall 186 is extended from the bottom surface of the second pressing block 180 at a side of the front and rear bosses 182, 185 and at a first end (right end in FIGS. 1 and 6) of the second pressing block 180 adjacent to the front boss 182. A second extension 181*a* is extended from the first end surface of the second pressing block 180, and a second U-shape groove 181 is formed in the bottom surface of the second extension 181*a*.

The front and rear bosses 182, 185 of the second pressing block 180 are to be fitted in front and rear notches 104*b*, 106*b* respectively so as to accurately position the second pressing block 180 on the casing 100, in which the front and rear notches 104*b*, 106*b* are formed at front and rear sides of the second through hole 107 of the second mounting part 101*b* along the longitudinal direction of the casing 100 (right and left direction in FIGS. 1 and 6).

In the assembled state, when a handle 161 of the bail 160 is rotated upward, a second rotation shaft 164 of the bail 160 applies an acclivitous force to the second pressing block 180 by pressing against the second U-shape groove 181 of the second extension 181a. The second side wall 186 of the second pressing block 180 serves the function of reinforcing.

Another screw 190 passes through the second through hole 184 and then is screwed into the second threaded hole 107, so that the bottom surface 183 of the second pressing block 180 abuts on the second top surface 108 of the second mounting part 101b of the casing 100.

7. Second Spring 150

As shown in FIGS. 1 and 8, two springs 150 are fitted over the first and second conical protrusions 1012, 1015 and disposed horizontally in the horizontal slide slot 1013, respectively. A first stop lug 173 of the brake member 170 contacts one end of one second spring 150 and a second stop lug 173 contacts one end of the other second spring 150, in which the first and second stop lugs 173, 174 are extended from two side surface adjacent to the front end surface 171 and the bottom surface of the brake member 170. The second springs 150 enable the brake member 170 to return (restore) to its initial position.

8. Bail 160

As shown in FIGS. 1, 4-5, and 6, the bail 160 is in the form of a substantially square endless ring which is symmetrical about the vertical axis X (see FIGS. 1 and 5) of the bail 160. Specially, the bail 160 comprises a handle 161, a second side arm 162, a second connection arm 163, a second rotation shaft 164, a cam portion 165, a first rotation shaft 166, a first connection arm 167, and a first side arm 168 which are connected in sequence.

The handle 161 is preferably made of a material having a good griping feeling, such as plastic.

During assembling, the first rotation shaft 166 and the second rotation shaft 164 are received and fitted in the first U-shape groove 141 of the first pressing block 140 and the second U-shape groove 181 of the second pressing block 180 respectively, and the cam portion is brought into contact with the front end surface 171 of the brake member 170 so as to apply a force to the brake member 170 in a direction parallel to the direction of inserting the opto-electronic module into the cage.

In the locking state, the first side arm 168 and the second side arm 162 are brought into contact with the first end surface portion 103 and the second end surface portion 107 of the first end surface of the casing 100. During unlocking, the cam portion 166 pushes against the front end surface 171 of the brake member 170 such that the brake member 170 is pushed toward the cage. When unlocking the opto-electronic module, the handle 161 is pulled up, and the finish position of the rotation of the bail 160 is ensured by contacts between the first and second connection arms 167, 168 and the stop surfaces 147, 187 of the first and second pressing blocks 140, 180.

FIG. 4 is a side view of the bail 160, in which an angle α is formed between a plane where the cam portion 165 is located and the first connection arm 167 as well as the second connection arm 163. In order to adjust the stroke of the brake member 170 as an optimal value, the angle α is preferably in the range of 72 degree to 78 degree.

FIG. 10 shows the relative position of the unlocking and resetting device in the cage, in which two opto-electronic modules are shown. When the opto-electronic module is in the unlocked state, the uppermost point of the bail 160 is still located below the top surface of the opto-electronic module, even in a compact cage, the two opto-electronic modules will not interfere with each other during unlocking.

The mounting operation of the bail 160 is as follows: firstly, the bail 160 is placed at the light opening end surface (first end surface, right end surface in FIGS. 1 and 6). Next, the first and second pressing blocks 140, 180 are disposed on the first and second top surface 105, 108 of the first and second mounting part 101a, 101b respectively. Finally, two screws 190 pass through the first and second through holes 144, 184 and are then screwed into the first and second threaded holes 102, 107, respectively. Thereby, the mounting of the bail 160 is accomplished.

9. Brake Member 170

Figure 9:
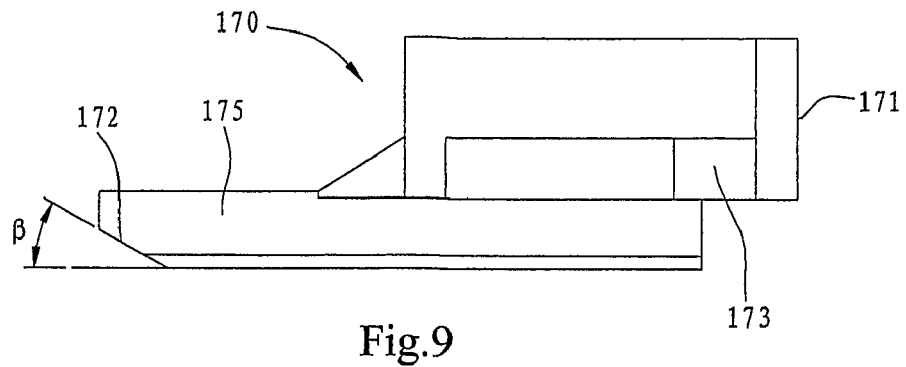
FIG. 9 is a schematic view showing the brake member of the unlocking and resetting device in FIG. 1.

As shown in FIGS. 1, 9 and 10, the brake member 170 is a substantially rectangular parallelepiped block having a slide rod 175 and first and second stop lugs 173, 174. Specially, the brake member 170 has a front end surface (right end surface in FIGS. 1 and 9) 171, a rear end surface opposite to the front end surface, first and second stop lugs 173, 174 extended from two side surface of the brake member 170 adjacent to the front end surface 171 and the bottom surface of the brake member 170 respectively, a slide rod 175 extended from the rear end surface of the brake member 170, in which a second bevel 172 is formed at a distal end (left end in FIGS. 1 and 9) of the slide rod 175.

The assembling operation of the brake member 170 is as follows: the brake member 170 is horizontally inserted and fitted into the horizontal slide slot 1013 of the casing 100, in which the slide rod 175 is inserted into the slide groove 112 of the insert block 110 and the second bevel 172 is brought into contact with and abuts against the first bevel 113 of the insert block 110. In order to ensure a good slide fit between the brake member 170 and the insert block 110, the slope of the first bevel 113 is preferably identical with that of the second bevel 172. As shown in FIG. 9, an angle β between the second bevel 172 and the horizontal plane is preferably in the range of 27 degree to 33 degree. The first and second lugs 173, 174 contact and abut against the second springs 150, so that the second springs 150 applies a horizontal pushing force to the brake member 170. The moving direction of the brake member 170 during unlocking is consistent with that of inserting the opto-electronic module into the cage.

10. Screw 190

As shown in FIGS. 1 and 6, the screws 190 are used to fix the first and second pressing blocks 140, 180 onto the casing 100.

11. Shell 200

As shown in FIG. 1, the shell 200 is in the form of a long U-shape member. A through opening 202 is formed through the top surface of the shell 200 and a plurality of catching grooves 203 are formed at both sides of the shell 200 adjacent to the bottom of the shell 200.

The assembling operation of the shell 200 is as follows: the shell 200 is fitted over the casing 100 from above, and the catching grooves 203 will be engaged with the catching hooks 1018 of the casing 100. The upper portion of the insert block 110 will be inserted through the through opening 202. The shell 200 can position the insert block 110 and also protect the other components such as a printed circuit board in the casing 100 from outer environment.

The operation of the unlocking and resetting device according to the embodiment of the present invention is described below.

When the opto-electronic module is in the locking state, the first side arm 168 and the second side arm 164 of the bail 160 abut against the first and second end surface portions 103, 101 of the casing 100 respectively.

The bail 160 is rotated such that the cam portion 165 pushes against the first end surface 171 of the brake member 170, thereby the brake member 170 is pushed toward the cage. The second bevel 172 of the brake member 170 abuts against the first bevel 112 of the insert block 110 so as to press the insert block 170. When the first and second connection arms 167, 163 contact the stop surface 147 of the first pressing block 140 and the stop surface 187 of the second pressing block 180 respectively, the bail 160 stops rotating, and the projecting surface 114 of the insert block 110 is lowered below the top surface 201 of the shell 200, so that the opto-electronic module is in the unlocking state.

Upon releasing the bail 160, since the insert block 110 is biased by the first springs 120 and the brake member 170 is biased by the second springs 150, the first end surface 171 of the brake member 170 pushes against the cam portion 165 of the bail 160, so that the bail 160 returns (restores) to its initial position.

It should be noted that the components, structures and functions of the unlocking and resetting device and the opto-electronic module that are not described herein are identical with that in the prior art, so that their detailed descriptions are omitted here for purpose of concision.

Although preferred embodiments have been shown and described, it would be appreciated by a person skilled in the art that changes can be made to the present invention without departing from its substantial spirit or essential principle. All the changes occurring within the scope of this invention or within the equivalent scope are included in this invention.

What is claimed is:

1. An unlocking and resetting device for an opto-electronic module, comprising:
    a casing having a substantially rectangular parallelepiped shape and formed with a blind hole and a horizontal slide slot, in which the blind hole is formed vertically in the casing adjacent to the first end of the casing and the horizontal slide slot is formed at a top surface of the casing and closer to the first end than the blind hole, and first and second mounting parts are formed in the top surface of the casing at both sides of the horizontal slide slot and symmetrical with each other about a longitudinal axis of the casing;
    an elastic piece adapted to be mounted onto the casing from a bottom of the casing;
    a shell adapted to be fitted over the casing from a top of the casing;
    first springs adapted to be disposed in the blind hole;
    an insert block adapted to be inserted into the blind hole, in which a slide groove is formed vertically at a tope end of the insert block and a bottom end of the insert block is to be supported by the first springs;
    a brake member adapted to be inserted and disposed in the horizontal slide slot;
    second springs to be disposed between the horizontal slide slot and the brake member along the longitudinal direction of the casing;
    first and second pressing blocks adapted to be mounted onto first and second mounting parts and formed with first and second extensions respectively, in which first and second U-shape grooves are formed in bottom surfaces of the first and second extensions respectively; and
    a bail disposed at the first end of the casing and including a handle a second side arm, a second connection arm, a second rotation shaft, a cam portion, a first rotation shaft, a first connection arm, and a first side arm which are connected in sequence, in which the cam portion is adapted to abut a front end of the brake member and the first and second rotations are adapted to be received in the first U-shape groove of the first pressing block and the second U-shape groove of the second pressing block respectively.

2. The unlocking and resetting device for opto-electronic module according to claim 1, wherein:
    a boss is formed on a bottom surface of the blind hole;
    first and second conical protrusions are formed on first and second end surface portions of the horizontal slide slot respectively for engaging the second springs; and
    first and second projecting bars are extended from the first and second end surface portions along and on the bottom surface of the horizontal slide slot for positioning the second springs.

3. The unlocking and resetting device for opto-electronic module according to claim 1, wherein:
    a first bevel is formed in the slide groove of the insert block; and an extension projection is formed on the bottom end of the insert block.

4. The unlocking and resetting device for opto-electronic module according to claim 1, wherein:
    the first pressing block are formed with front and rear bosses on a bottom surface thereof, a first through hole is formed between the first boss and the second boss, and a first side wall is extended from the bottom surface of the first pressing block at a side of the front and rear bosses and at the first end of the first pressing block adjacent to the front boss; and
    the second pressing block are formed with front and rear bosses on a bottom surface thereof, a second through hole is formed between the first boss and the second bosses, and a second side wall is extended from the bottom surface of the second pressing block at a side of the front and rear bosses and at the first end of the second pressing block adjacent to the front boss.

5. The unlocking and resetting device for opto-electronic module according to claim 1, wherein:
    an angle a formed between a plane where the cam portion is located and the first connection arm as well as the second connection arm is in a range of 72 to 78 degree.

6. The unlocking and resetting device for opto-electronic module according to claim 1, wherein:
    the handle is made of a plastic material having good griping feeling.

7. The unlocking and resetting device for opto-electronic module according to claim 1, wherein:
    the brake member has a front end surface, a rear end surface opposite to the front end surface, first and second stop lugs extended from two side surface of the brake member adjacent to the front end surface and the bottom surface of the brake member respectively, and a slide rod extended from the rear end surface of the brake member, and
    a second bevel is formed at a distal end of the slide rod and adapted to abut against the first bevel.

8. The unlocking and resetting device for opto-electronic module according to claim 7, wherein:
    an angle $\beta$ between the second bevel and the horizontal plane is in a range of 27 to 33 degree.

* * * * *